(12) United States Patent
Steffka et al.

(10) Patent No.: US 10,666,031 B1
(45) Date of Patent: May 26, 2020

(54) POWER DISTRIBUTION BOX ASSEMBLY WITH BLIND INSTALLATION FEATURE

(71) Applicant: Sumitomo Wiring Systems, Ltd., Yokkaichi, Mie (JP)

(72) Inventors: Aaron Steffka, Farmington Hills, MI (US); Nathan Like, Farmington Hills, MI (US)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 16/459,742

(22) Filed: Jul. 2, 2019

(51) Int. Cl.
| | | |
|---|---|---|
| *H02G 3/14* | (2006.01) | |
| *H02G 3/16* | (2006.01) | |
| *H02G 3/08* | (2006.01) | |
| *B60R 16/023* | (2006.01) | |

(52) U.S. Cl.
CPC .............. *H02G 3/081* (2013.01); *H02G 3/14* (2013.01); *H02G 3/16* (2013.01); *B60R 16/0238* (2013.01)

(58) Field of Classification Search
CPC . H02G 3/081; H02G 3/14; H02G 3/16; B60R 16/0238
USPC ........................................................ 174/562
See application file for complete search history.

(56) References Cited

U.S. PATENT DOCUMENTS

| | | | | |
|---|---|---|---|---|
| 5,531,345 A * | 7/1996 | Nakamura | ............. | H02G 3/088 220/3.8 |
| 5,788,529 A * | 8/1998 | Borzi | ................... | H01R 9/2458 439/364 |
| 6,739,889 B1 * | 5/2004 | Daggett | ........... | H01R 13/62938 439/157 |
| 6,850,421 B2 * | 2/2005 | Boyd | ................. | H01H 85/2045 361/797 |
| 7,799,991 B1 * | 9/2010 | Advey | ............... | H01R 13/5213 174/50 |
| 8,907,230 B2 * | 12/2014 | Chen | .................. | H01R 13/5216 174/520 |
| 8,961,245 B2 * | 2/2015 | Kowtun | ............. | B60R 16/0238 439/723 |

FOREIGN PATENT DOCUMENTS

| | | |
|---|---|---|
| JP | H09163552 A | 6/1997 |
| JP | H1141755 A | 2/1999 |
| JP | 2000184555 A | 6/2000 |

* cited by examiner

*Primary Examiner* — Timothy J Thompson
*Assistant Examiner* — Michael F McAllister
(74) *Attorney, Agent, or Firm* — Honigman LLP (57) ABSTRACT

A power distribution box assembly configured to assist in a blind installation is provided. The power distribution box includes a rib disposed on a side wall of the power distribution box. A top cover is configured to close the top of the power distribution box. The top cover includes a guide shoulder disposed on a side wall of the top cover. The guide shoulder extends past a bottom edge of the side wall of the top cover and is configured to be seated over the rib of the power distribution box. Accordingly, the guide shoulder and rib engagement provides a tactile response indicating a proper position of the top cover with respect to the power distribution box.

17 Claims, 9 Drawing Sheets

POWER DISTRIBUTION BOX ASSEMBLY WITH BLIND INSTALLATION FEATURE

TECHNICAL FIELD

The present specification generally relates to power distribution box assemblies, and more particularly to power distribution box assemblies having features configured to assist in a blind installation.

BACKGROUND

In general, electric junction box assemblies include a power distribution box for storing electric components configured to regulate and distribute power to various electric components. Generally stated, power is supplied to the power distribution box, wherein the power is regulated using commonly known components such as switches, relays, fuses, capacitors, resistors and the like. The regulated power is then supplied to selected electric components.

Figure 1:
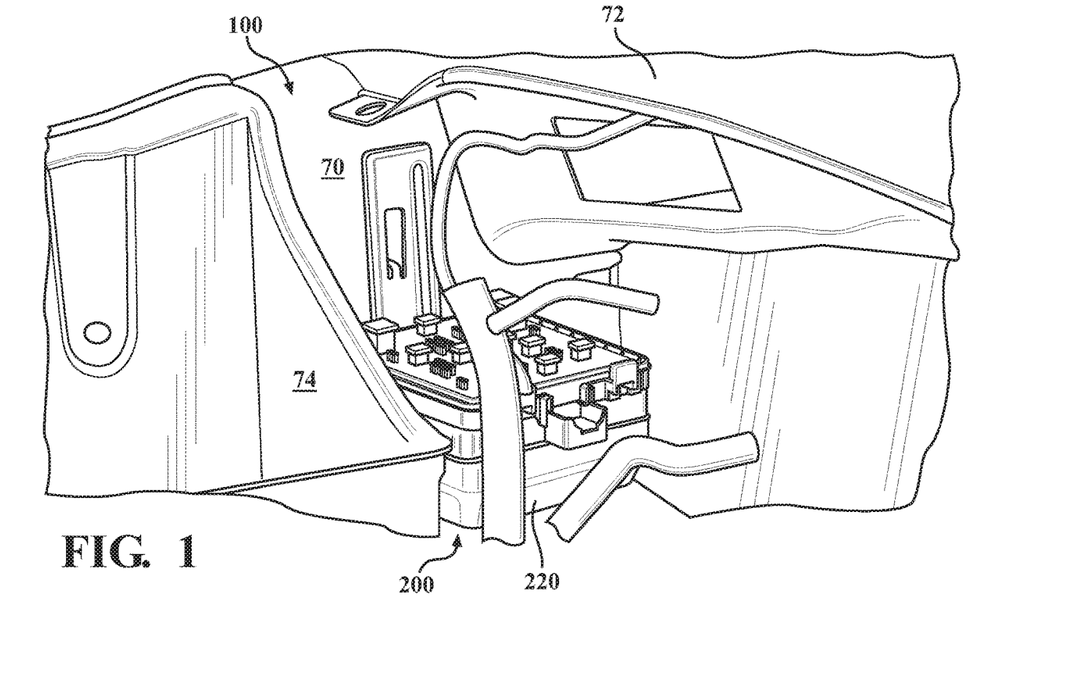
FIG. 1 schematically depicts a perspective view of the packaging space for holding a power distribution box assembly.
Figure 2:
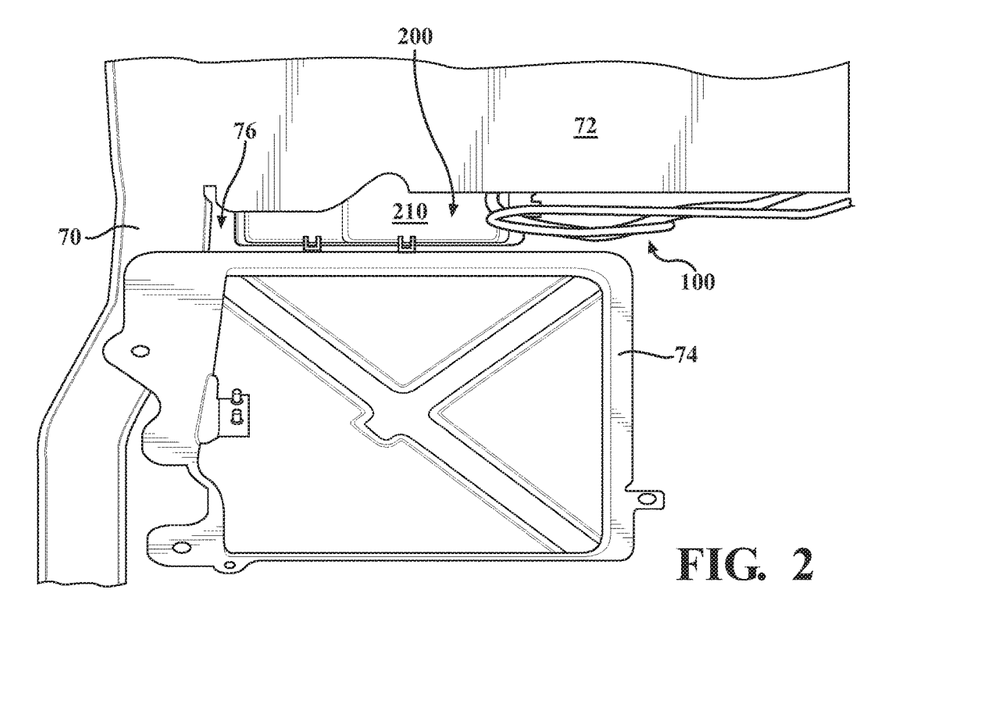
FIG. 2 is a top down view of the packaging space shown in FIG. 1.

Packaging space 100 for the power distribution box assembly 200 has decreased as a result of an increase in components to support vehicle functions, such as proximity sensors, cameras, and the like, as illustratively shown in FIGS. 1 and 2. As such, the installer may be forced to assemble the power distribution box assembly 200 in a tight space wherein vehicle structure obscures the power distribution box assembly 200. As such, the installer must conduct a blind installation. As used herein, a blind installation refers to an installation where parts of the power distribution box assembly 200 is visually obscured-not necessarily completely obscured.

Figure 3:
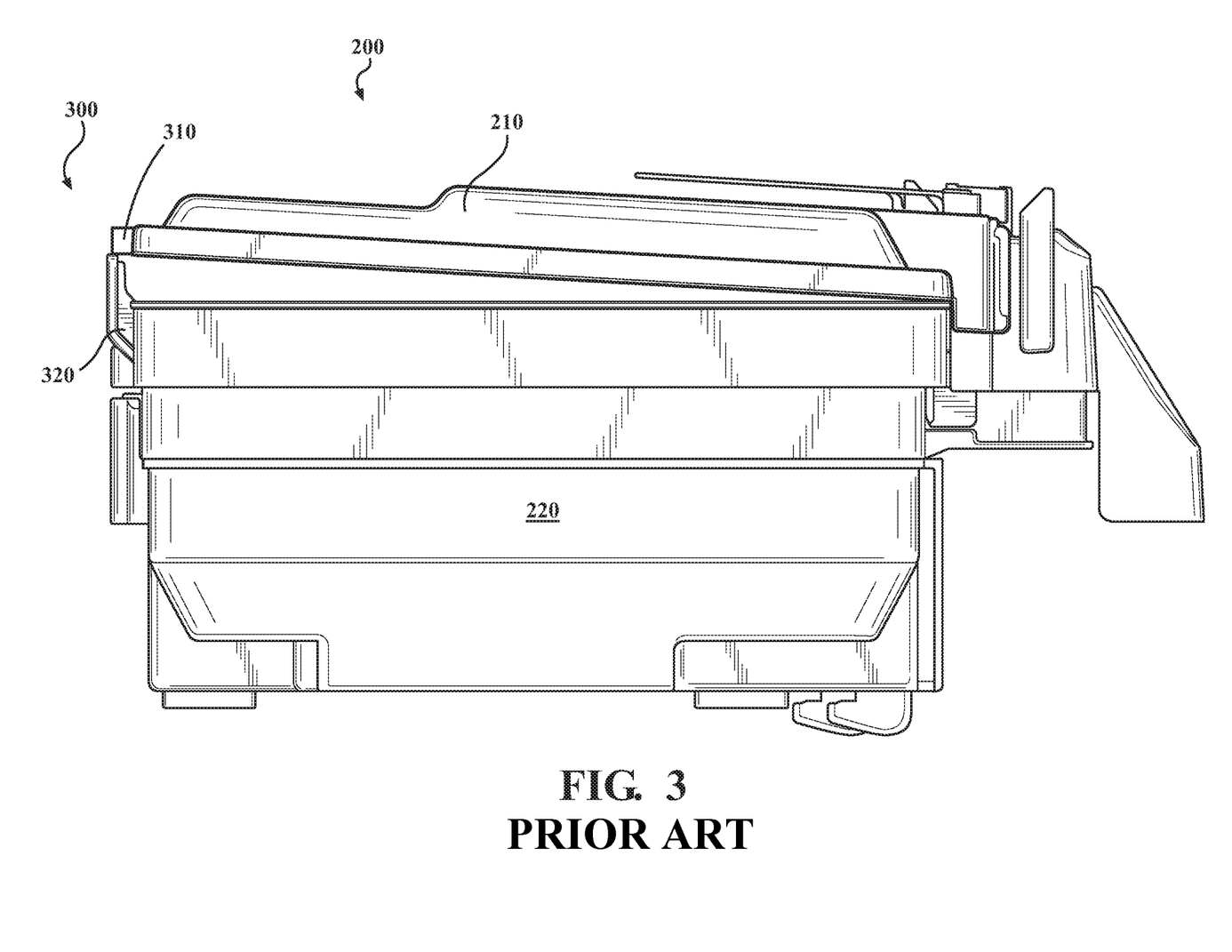
FIG. 3 is a side view of a power distribution box assembly of the prior art.

Currently, the power distribution box assembly 200 is mounted in the packaging space 100 and the top cover 210 is then mounted onto the power distribution box 220. The top cover 210 includes a side wall bounding the periphery of the top surface of the power distribution box 220, as shown in FIG. 3. However, the locking mechanisms are obscured by vehicle structure surrounding the packaging space 100. Ensuring the locking mechanism is properly aligned is done by visually aligning the visible portion of the top cover 210 with the power distribution box 220.

Figure 4:
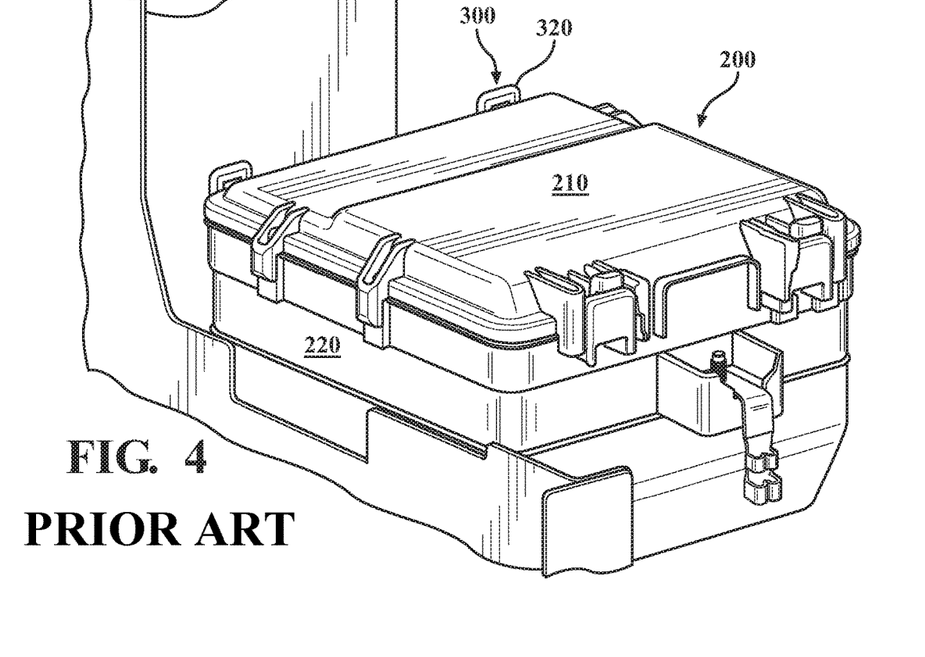
FIG. 4 is a perspective view of the power distribution box shown in FIG. 3.
Figure 5:
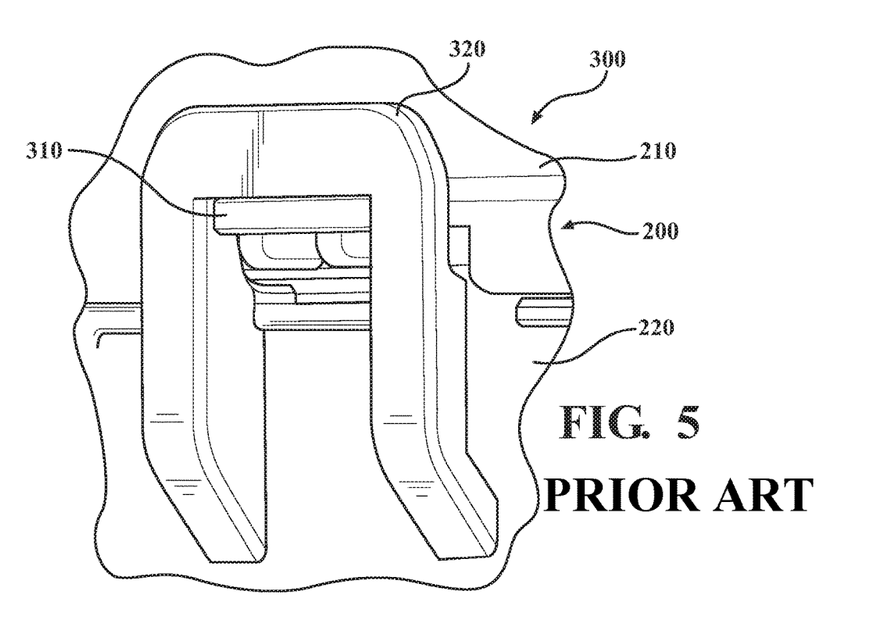
FIG. 5 is view of the locking mechanism of the power distribution box assembly shown in FIG. 4.

FIGS. 4 and 5 show a current locking mechanism 300, wherein a tab 310 of the top cover 210 is pressed down onto a catch 320 of the power distribution box 220. In some instances, the tab 310 may not be fully inserted into the catch 320 when the top cover 210 is not aligned with the power distribution box 220, as shown in FIG. 3.

Accordingly, it remains desirable to have an electronic junction box assembly configured to assist the installer install the power distribution box assembly in a blind installation.

SUMMARY

In one embodiment, a power distribution box assembly configured to be assembled in a packaging space obscuring the view of and blocking complete access to the power distribution box assembly is provided. The power distribution box includes a rib disposed on a side wall of the power distribution box.

A top cover is configured to close the top of the power distribution box. The top cover includes a guide shoulder. The guide shoulder is disposed on a side wall of the top cover. The guide shoulder extends past a bottom edge of the side wall of the top cover and is configured to be seated over the rib of the power distribution box. Accordingly, the guide shoulder and rib engagement provides a tactile response indicating a proper position of the top cover with respect to the power distribution box. For example, by properly positioning the top cover to the power distribution box, locking features may be properly aligned to facilitate an engagement of the locking features even though the locking features are hidden by vehicle structure.

In one aspect, the rib is recessed from a top surface of the power distribution box. In another aspect the power distribution box includes a pair of ribs and the top cover includes a pair of guide shoulders. Each of the ribs includes an engagement surface extending along a height of the power distribution box. The engagement surface is a planar surface. An inner surface of each of the pair of guide shoulders is configured to be seated against an engagement surface of a corresponding one of the pair of ribs.

A power distribution box assembly configured to facilitate an engagement of the top cover to the power distribution box in a blind installation is also provided. In this aspect, the top cover includes a rear tab and the power distribution box includes a rear catch disposed on a second back wall of the power distribution box. The rear catch is configured to engage the rear tab from a downward load. The rear catch includes a pair of legs and a catching member interconnecting a top of each of the pair of legs. The pair of legs are integrally formed to the second back wall of the power distribution box. A portion of each of the pair of legs extend outwardly from the second back wall so as to form a slot. The slot allows the pair of legs to flex outwardly so as to accommodate the rear tab upon a downward load placed upon the top cover.

In one aspect, the top cover further includes a front latch opposite of the rear tab and the power distribution box includes a front catch configured to engage the front latch. The front catch and the front latch may be configured to engage each other upon receipt of a downward load. As such both the front and the back of the power distribution box assembly are secured.

In one aspect, the power distribution box assembly includes a rib disposed on one of a pair of side walls, and wherein the top cover further includes a guide shoulder, the guide shoulder disposed on one of a pair of first side walls of the top cover, the guide shoulder extending past a bottom edge of the one of the pair of first side walls of the top cover, the guide shoulder configured to be seated over the rib of the power distribution box, wherein the guide shoulder so as to provide a tactile response indicating a proper position of the top cover with respect to the power distribution box.

Accordingly, the power distribution box assembly is configured to assist in a blind installation of the power distribution box assembly and to help facilitate a locking engagement of the top cover to the power distribution box assembly by simply pressing the top cover onto the power distribution box assembly.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

FIG. 7 is an exploded view of the power distribution box assembly shown in

FIG. 6;

DETAILED DESCRIPTION

Referring generally to the figures, embodiments of the present disclosure include a power distribution box assembly configured to assist in a blind installation, wherein the packaging space obscures the view of the power distribution box assembly. The power distribution box includes a rib disposed on a first side wall of the power distribution box. A top cover is configured to close the top of the power distribution box. The top cover includes a guide shoulder disposed on a first side wall of the top cover. The guide shoulder extends past a bottom edge of the first side wall of the top cover and is configured to be seated over the rib of the power distribution box. Accordingly, the guide shoulder and rib engagement provides a tactile response indicating a proper position of the top cover with respect to the power distribution box.

Figure 6:
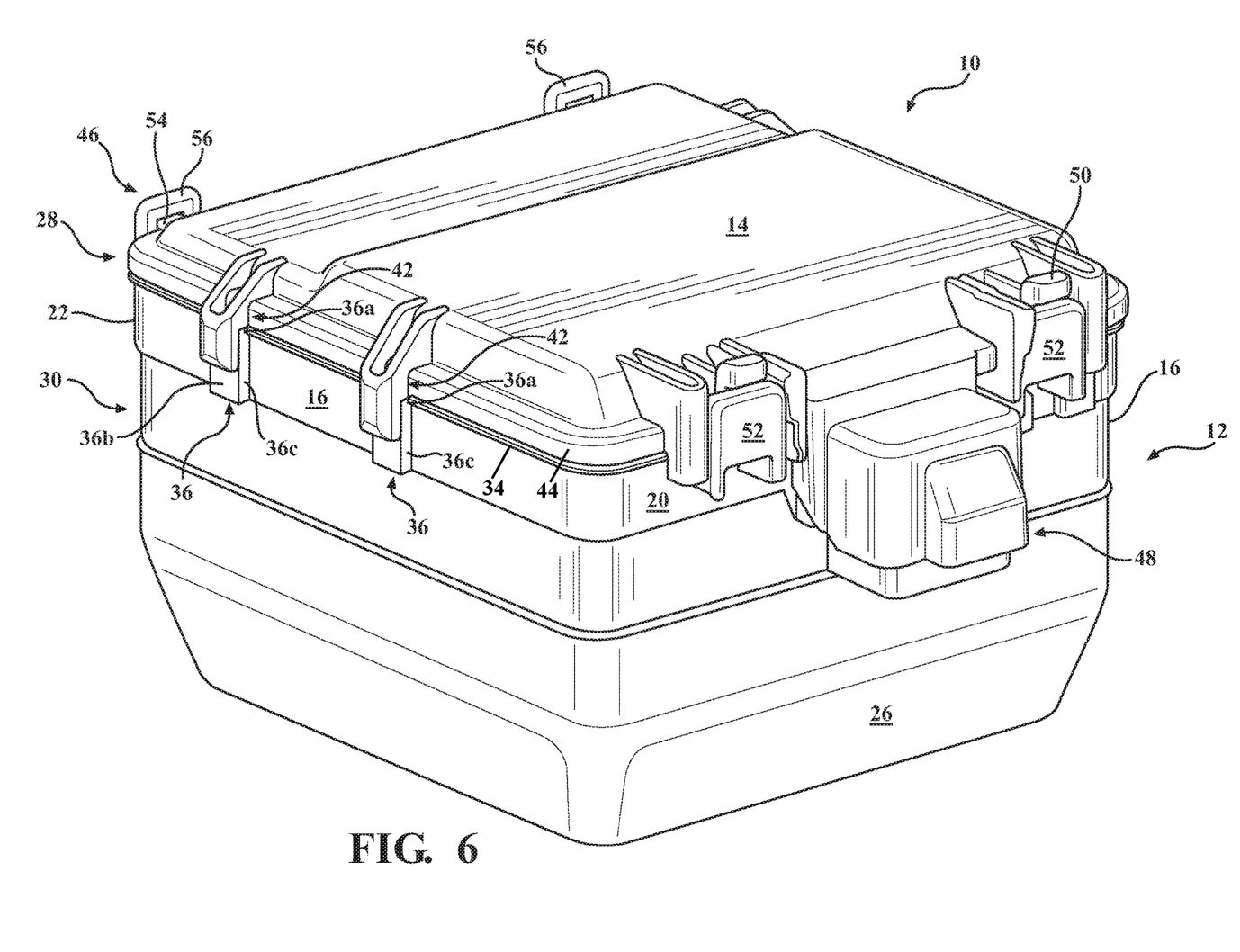
FIG. 6 perspective view of a power distribution box assembly according to one or more embodiments described an illustrated herein.

As used herein the terms front and rear are made in reference to the orientation of the related part as shown in FIG. 6. The term top and bottom refer to the orientation of the part as shown in the figures.

With reference now to FIG. 6, an illustrative embodiment of a power distribution box assembly 10 is provided. The power distribution box assembly 10 may be formed of a durable material adaptable for use in an injection molding process, illustratively including polypropylene.

The power distribution box assembly 10 includes a power distribution box 12 and a top cover 14. The power distribution box 12 includes a pair of first side walls 16, a floor 18, a first front wall 20 and a first back wall 22 interconnected so as to define a storage space 24 for housing electric components configured to regulate and distribute power.

Figure 7:
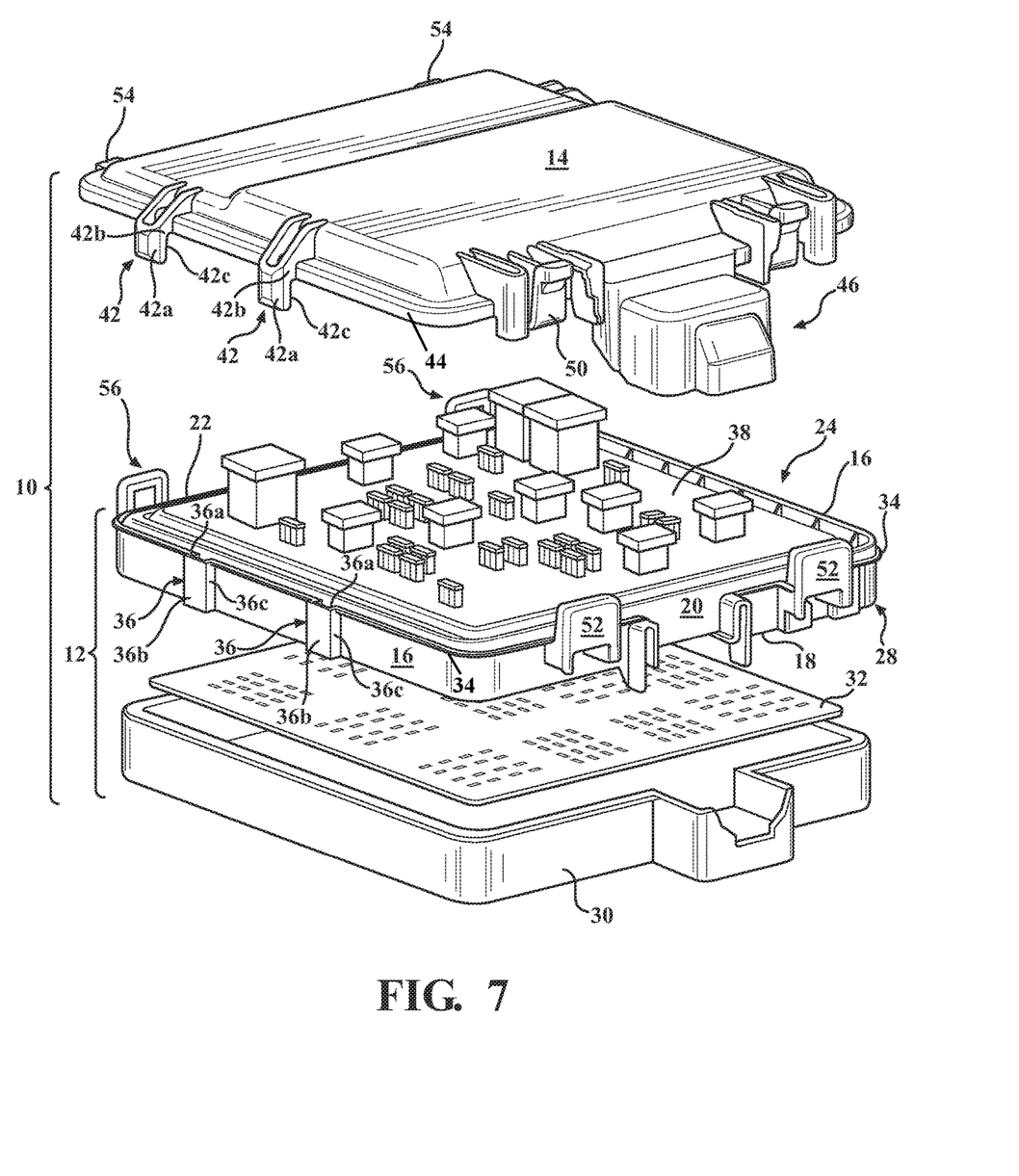

With reference again to FIG. 6 and now to FIG. 7, a description of the power distribution box 12 is provided. In one aspect, the power distribution box 12 is configured to be mounted to a bottom cover 26. The top of the power distribution box 12 is closed by the top cover 14. FIG. 7 shows an aspect of the power distribution box 12, wherein the power distribution box 12 includes a top housing 28 and a bottom housing 30.

A printed circuit board 32 is disposed between the top housing 28 and the bottom housing 30. A plurality of electric components, such as fuses and relays, are mounted within the top and bottom housings 28, 30 so as to distribute electrical power to vehicle components. However, it should be appreciated that the power distribution box 12 shown is provided for illustrative purposes, and that the top housing 28, bottom housing 30 and bottom cover 26 may be formed as a single unit, or in other variations such as the top and bottom housings 28, 30 being a singular unit.

The power distribution box assembly 10 is configured to facilitate a blind installation. The power distribution box 12 includes a bead 34 extending around a peripheral edge of the top housing 28. The bead 34 provides a surface for which the bottom edge of the top cover 14 is seated against, so as to hold the top cover 14 in a predetermined position with respect to the power distribution box 12.

The power distribution box 12 further includes a rib 36 disposed on one of the first side walls 16 of the power distribution box 12. In particular, the rib 36 is disposed on the pair of the first side wall 14 that is visible when the power distribution box 12 is mounted in a packaging space 100 illustratively shown in FIGS. 1, 2, 4 and 8.

As shown in FIGS. 6 and 7, the ribs 36 are formed on the top housing 28 of the power distribution box 12. The rib 36 extends along an axis defining a height of the power distribution box 12. The rib 36 protrudes from the outer surface of the first side wall 16.

The rib 36 includes a top edge 36a. The top edge 36a is recessed from a top surface 38 of the power distribution box 12 and is generally coplanar with the bead 34. The top edge 36a extends outwardly with respect to the bead 34. The rib 36 further includes an engagement surface 36b. The engagement surface 36b is a planar surface. The engagement surface 36b extends along a height of the power distribution box 12. A pair of rib walls 36c are disposed on opposite sides of the engagement surface 36b of the rib 36 and extend outwardly from the first side wall 16 a greater distance than the bead 34 and is generally the same width as the top edge 36a.

The top cover 14 includes a guide shoulder 42. The guide shoulder 42 is disposed on a second side wall 44 of the top cover 14. The guide shoulder 42 extends past a bottom edge of the second side wall 44 of the top cover 14 and is configured to be seated over the rib 36 of the power distribution box 12.

Figure 9:
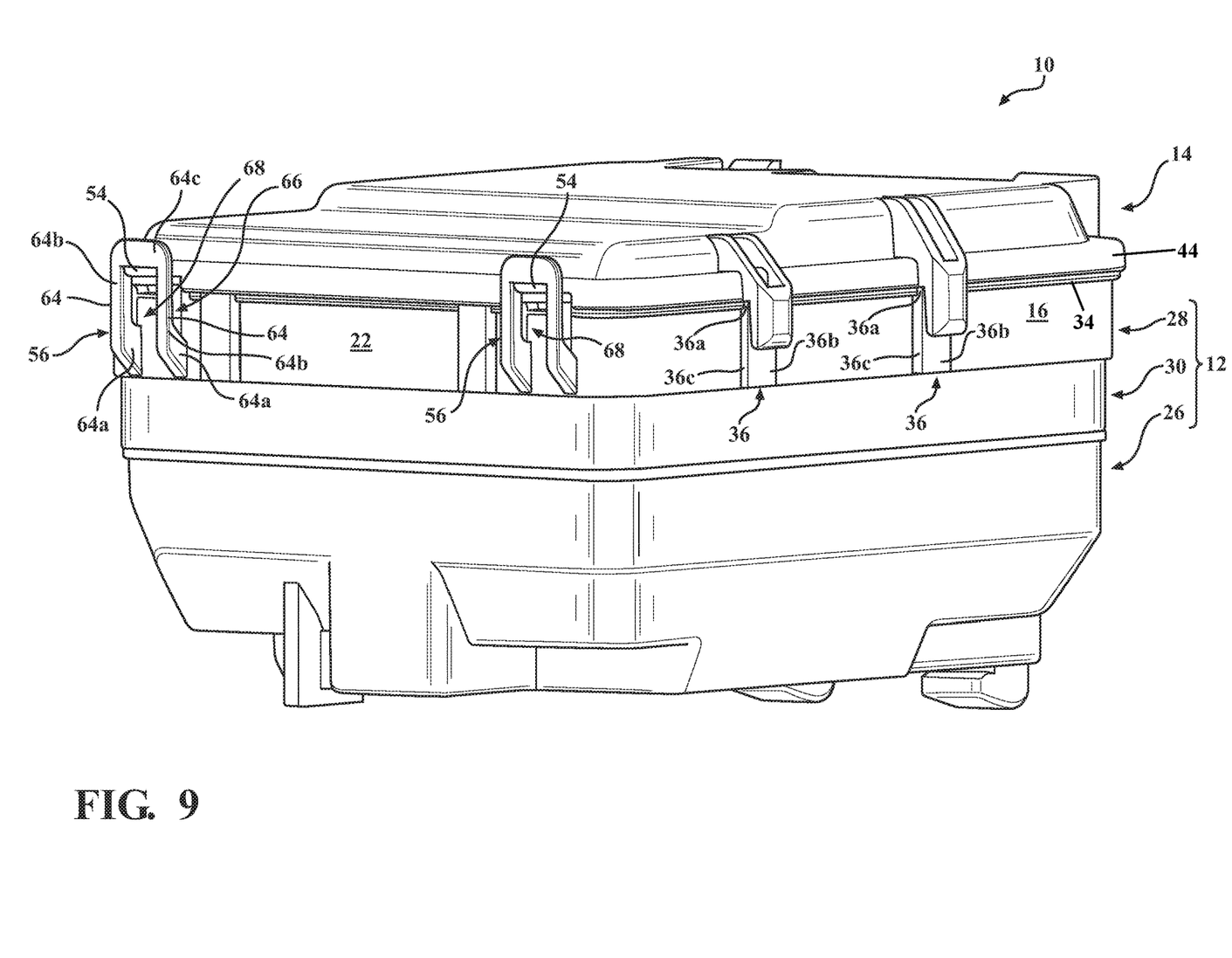
FIG. 9 is a perspective view of the power distribution box assembly shown in FIG. 6, taken from the back.

FIGS. 6, 7 and 9 show the guide shoulders 42 seated on a corresponding rib 36. In particular, the guide shoulders 42 include an elongated portion 42a and a side portion 42b. The side portion 42b is dimensioned to be seated onto the top edge 36a of the rib 36. The elongated portion 42a includes an inner surface 42c. The inner surface 42c is planar and is configured to be seated against the engagement surface 36b of a corresponding rib 36.

Accordingly, the guide shoulder 42 and rib 36 engagement provides a tactile response indicating a proper position of the top cover 14 with respect to the power distribution box 12. For example, by properly positioning the top cover 14 to the power distribution box 12, locking features may be properly aligned to facilitate an engagement of the locking features even though the locking features are hidden by vehicle structure.

In one aspect, the rib 36 is recessed from a top surface 38 of the power distribution box 12. In another aspect the power distribution box 12 includes a pair of ribs 36 and the top cover 14 includes a pair of guide shoulders 42. Each of the ribs 36 includes an engagement surface 36b extending along a height of the power distribution box 12. The engagement surface 36b is a planar surface. An inner surface 42c of each of the pair of guide shoulders 42 is configured to be seated against an engagement surface 36b of a corresponding one of the pair of ribs 36.

A power distribution box assembly 10 configured to facilitate an engagement of the top cover 14 to the power distribution box 12 in a blind installation is also provided. The power distribution box assembly 10 includes a front latching mechanism 46 and a rear latching mechanism 48. A description of the front latching mechanism 46 will be made with reference to FIGS. 6-8.

Figure 8:
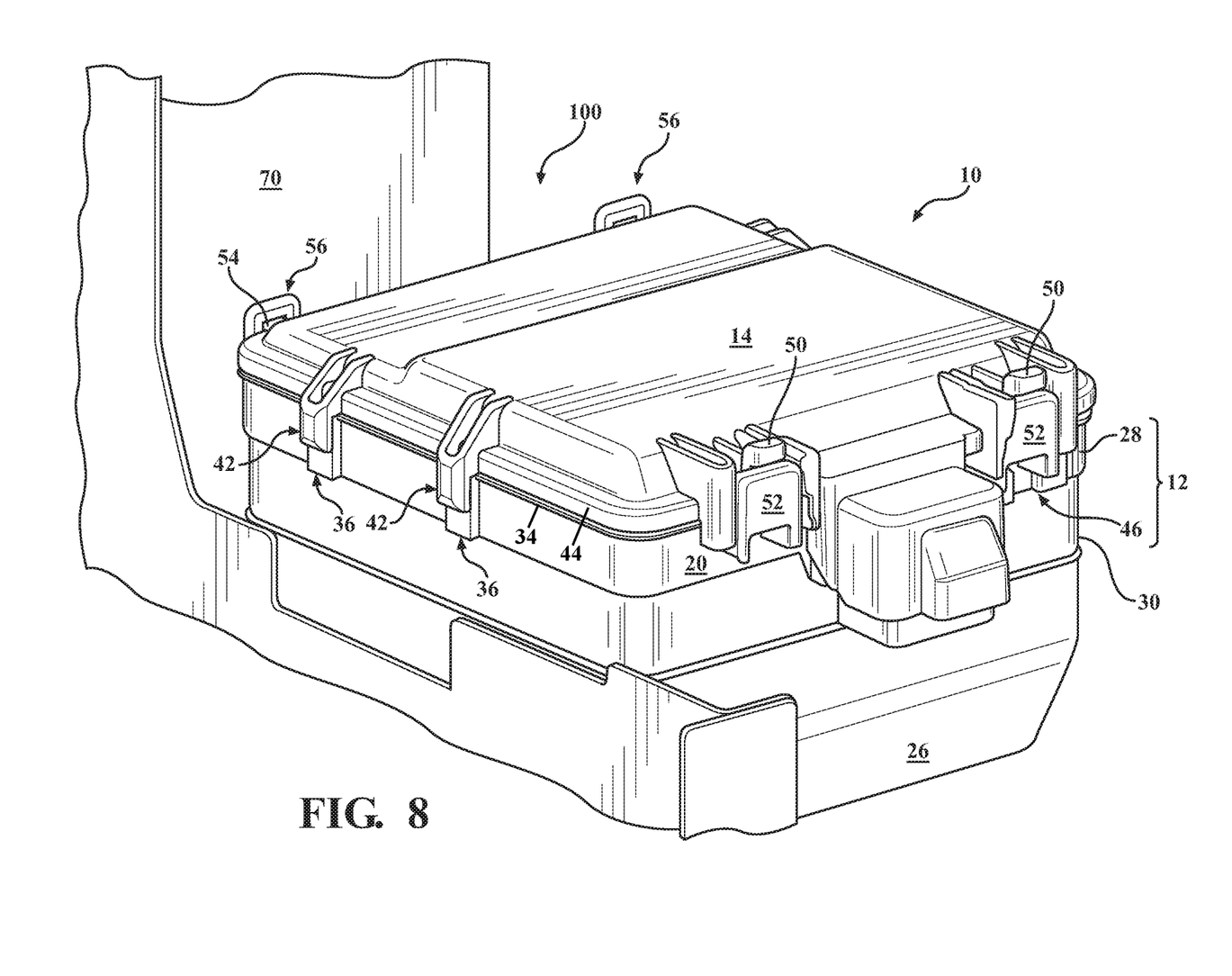
FIG. 8 is a view of the power distribution box assembly shown in FIG. 6 mounted within a packaging space.

In one aspect of a front latching mechanism 46, a front latch 50 is formed on the front of the top cover 14 and a front catch 52 is formed on the front of the power distribution box 12. The front latch 50 is configured to engage the front catch 52 so as to secure the top cover 14 to the power distribution box 12. In one aspect of a front latching mechanism 46, the front latch 50 is a resilient member having a slot and the front catch 52 is a planar member having a ramp shaped feature configured to engage the slot so as to retain the front latch 50 to the front catch 52.

With reference now to FIGS. 9-12 a description of an embodiment of the rear latching mechanism 48 is provided. The rear latching mechanism 48 is configured to help position the top cover 14 for engagement with the power distribution box 12 as well as secure the top cover 14 to the power distribution box 12. The rear latching mechanism 48 includes a pair of rear tabs 54 disposed on a back end of the top cover 14 and a pair of rear catches 56 disposed on the first back wall 22 of the power distribution box 12.

Figure 10:
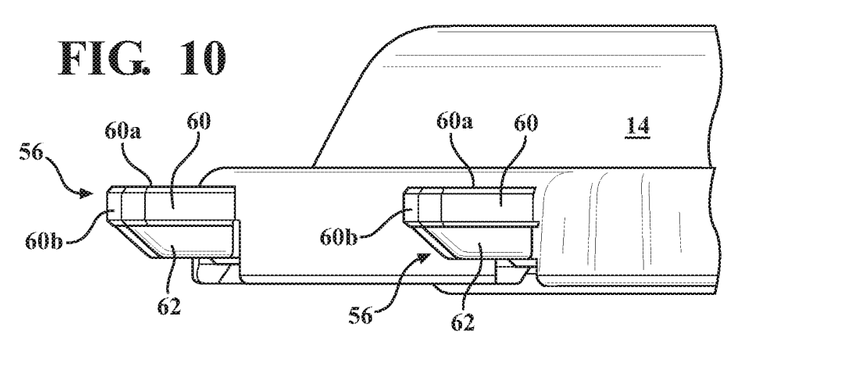
FIG. 10 is a perspective view of the top cover showing the rear tab.

With reference now to FIG. 10, the rear tabs 54 project outwardly from a second back wall 58 of the top cover 14. The rear tabs 54 include an elongated body portion 60 having a planar top surface 60a and a planar back wall 60b which is orthogonal to the top surface 60a. The rear tabs 54 include a support portion 62 integral to a bottom of the elongated body portion 60. The support portion 62 provides structural support for the elongated body portion 60 and is narrower than the width of the elongated body portion 60. A distal end of the support portion 62 is angled so as to define a ramp shape.

Figure 11:
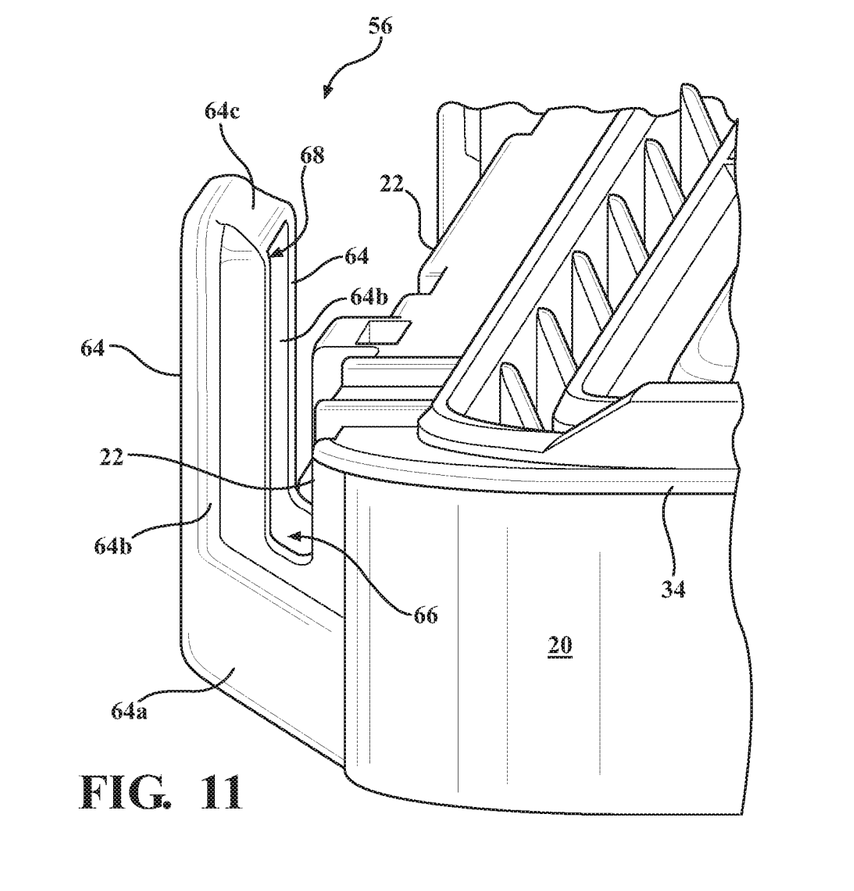
FIG. 11 is an isolated view of the catch.
Figure 12:
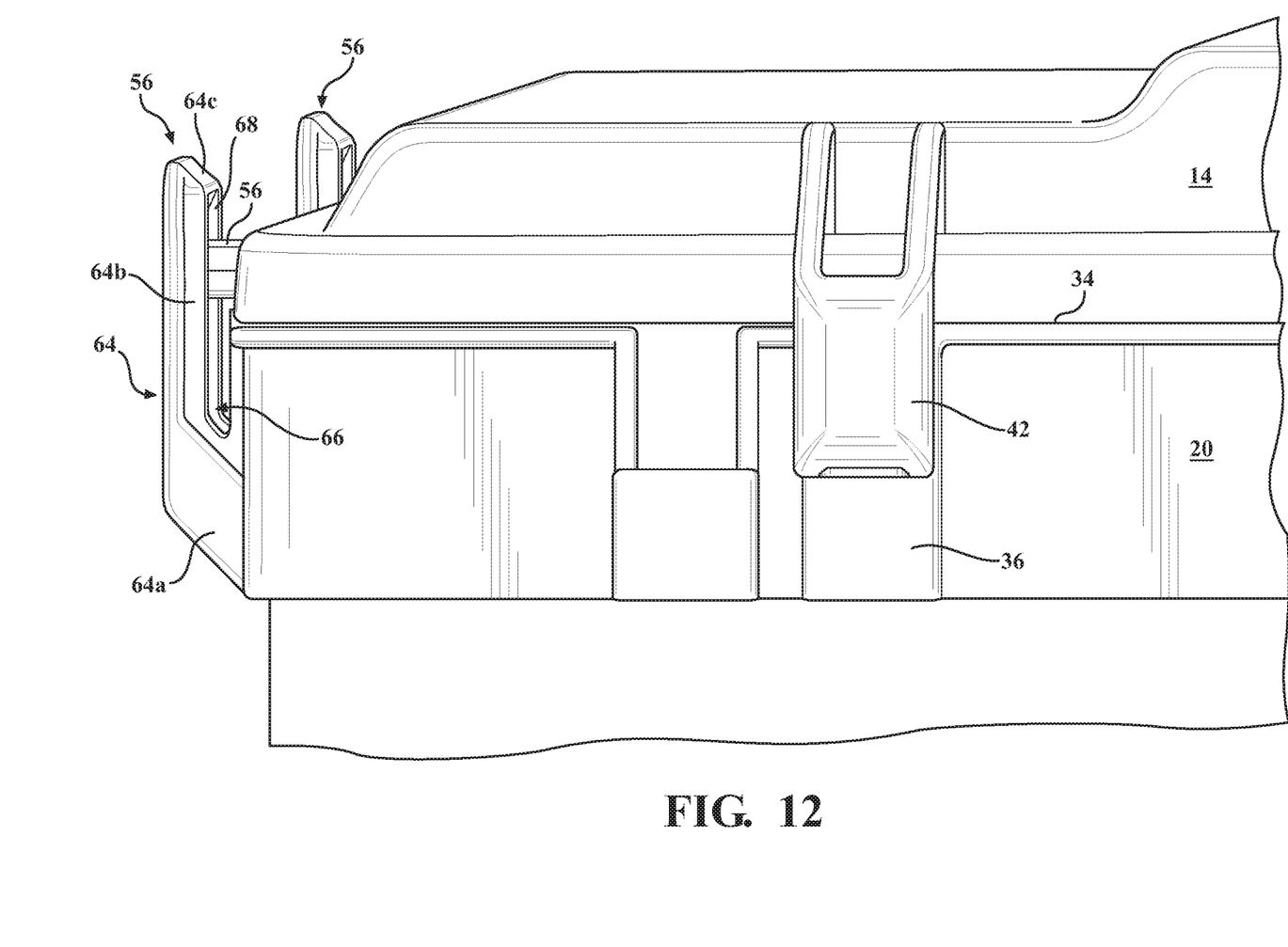
FIG. 12 is an isolated view of the power distribution box assembly showing the rear tab engaged with the catch.

With reference now to FIGS. 9 and 11, a description of the rear catch 56 is provided. The rear catch 56 includes a pair of legs 64 which extend outwardly and upwardly from the back wall of the power distribution box 12 so as to form a general "L" shape. In particular, the legs 64 include a base portion 64a which extends outwardly from the first back wall 22 of the power distribution box 12 and a flex portion 64b which is a generally resilient member extending upwardly from a distal end of the base portion 64a so as to define a slot 66 between the flex portion 64b and the first back wall 22.

A top end of each of the flex portions 64b are interconnected to each other by a catch member 64c. The catch member 64c is a generally elongated member and when taken in view of the pair of flex portions 64b forms a generally inverted U shaped dimension defining an opening 68 (between the flex portions 64b and underneath the catch member 64c) configured to receive a respective rear tab 54.

An operation of the power distribution box assembly 10 is now made with reference first to FIGS. 1 and 2. During the assembly of the automotive vehicle, the power distribution box 12 is mounted within a packaging space 100 defined by a passenger side panel 70 and a firewall 72. The firewall 72 is dimensioned to have an overhanging portion which obstructs access to the power distribution box 12. A visible side of the power distribution box 12 is also obstructed by a battery box 74. The vehicle is assembled with the power distribution box 12 mounted within the packaging space 100 with the top cover 14 removed. Thus, the installation of the top cover 14 is both visually and physically obstructed by the firewall 72 and the battery box 74. In particular, FIG. 2 provides a general depiction a perspective view of the installer. A small window 76 exists between the battery box 74 and the firewall 72 with which the top cover 14 is able to pass through.

The installer inserts the top cover 14 through the window 76 and tilts the top cover 14 so as to insert the rear tabs 54 into respective openings of the rear catches 56. As the top cover 14 is laid onto the power distribution box 12, the installer moves the top cover 14 until the guide shoulders 42 contact the respective ribs 36, which is made known by a tactile response. Thus, the top cover 14 is in proper position for engaging the front and rear latching mechanisms 46, 48.

Further, the rear latching mechanism 48 is configured with a rear catch 56 that flexes outwardly. Such a feature is desirable in this packaging environment where it may be difficult to see if the rear tabs 54 are fully seated within an opening of a respective rear catch 56. In particular, the guide shoulders 42 provide a tactile response indicating the top cover 14 is properly positioned with respect to the power distribution box 12. As such, the rear tabs 54 may not be fully seated within the opening 68, but are registered to engage the opening 68 of the rear catch 56.

To ensure that the top cover 14 is properly engaged with the power distribution box 12, the installer may simply press down on the rear of the top cover 14, wherein the ramp shape of the rear tab 54 urges the rear catch 56 outwardly, which is made possible by the slot between the flex portions 64b and the first back wall 22 of the power distribution box 12. The rear catch 56 is urged outwardly until the rear tab 54 passes the catch member 64c. Upon passing the catch member 64c, the flex portions 64b return to its natural state, securing the rear tab 54 between the flex portions 64b and the catch member 64c, as shown in FIG. 9.

Accordingly, the power distribution box assembly 10 is configured to assist in a blind installation of the power distribution box assembly 10 and to help facilitate a locking engagement of the top cover 14 to the power distribution box assembly 10 by simply pressing the top cover 14 onto the power distribution box assembly 10.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A power distribution box assembly configured to be assembled in a packaging space obscuring the view of the power distribution box assembly, the power distribution box assembly comprising:
   a power distribution box having a rib disposed on one of a pair of side walls, the rib having an engagement surface, the engagement surface being planar; and
   a top cover having a guide shoulder, the guide shoulder disposed on one of a pair of side walls of the top cover, the guide shoulder extending past a bottom edge of the one of the pair of side walls of the top cover, the guide shoulder having an inner surface configured to be seated over the rib of the power distribution box, the inner surface being planar the inner surface of the guide should configured to be seated against the engagement surface of the rib so as to provide a tactile response indicating a proper position of the top cover with respect to the power distribution box.

2. The power distribution box assembly as set forth in claim 1, wherein the rib includes a top edge, the top edge recessed from a top surface of the power distribution box.

3. The power distribution box assembly as set forth in claim 2, wherein the engagement surface of the rib extends along a height of the power distribution box and a pair of rib walls disposed on opposite sides of the rib.

4. The power distribution box assembly as set forth in claim 1, wherein the rib is a pair of ribs.

5. The power distribution box assembly as set forth in claim 4, wherein the top cover includes a pair of guide shoulders.

6. The power distribution box assembly as set forth in claim 5, wherein the inner surface of each of the pair of guide shoulders is configured to be seated against an engagement surface of a corresponding one of the pair of ribs.

7. The power distribution box assembly as set forth in claim 6, wherein the rib includes a top edge, the top edge recessed from a top surface of the power distribution box.

8. A power distribution box assembly configured to be assembled in a packaging space obscuring the view of the power distribution box assembly, the power distribution box assembly comprising:
a top cover having a rear tab;
a power distribution box having a catch disposed on a second back wall of the power distribution box, the configured to engage the rear tab, wherein the catch includes a pair of legs and a catching member interconnecting a top of each of the pair of legs, wherein the pair of legs are integrally formed to the second back wall of the power distribution box and a portion of each of the pair of legs extend outwardly from the second back wall so as to form a slot, the slot allowing the pair of legs to flex outwardly so as to accommodate the rear tab upon a downward load placed upon the top cover.

9. The power distribution box assembly as set forth in claim 8, wherein the top cover includes a front latch opposite of the rear tab.

10. The power distribution box assembly as set forth in claim 9, further including a front catch configured to engage the front latch.

11. The power distribution box assembly as set forth in claim 10, further including a rib disposed on one of a pair of side walls, and wherein the top cover further includes a guide shoulder, the guide shoulder disposed on one of a pair of side walls of the top cover, the guide shoulder extending past a bottom edge of the one of the pair of side walls of the top cover, the guide shoulder configured to be seated over the rib of the power distribution box, wherein the guide shoulder so as to provide a tactile response indicating a proper position of the top cover with respect to the power distribution box.

12. The power distribution box assembly as set forth in claim 11, wherein the rib includes a top edge, the top edge recessed from a top surface of the power distribution box.

13. The power distribution box assembly as set forth in claim 12, wherein the rib includes an engagement surface extending along a height of the power distribution box and a pair of rib walls disposed on opposite sides of the rib.

14. The power distribution box assembly as set forth in claim 13, wherein the engagement surface is a planar surface.

15. The power distribution box assembly as set for in claim 8, wherein the rib is a pair of ribs and the top cover includes a pair of guide shoulders.

16. The power distribution box assembly as set forth in claim 15, wherein an inner surface of each of the pair of guide shoulders is configured to be seated against an engagement surface of a corresponding one of the pair of ribs.

17. The power distribution box assembly as set forth in claim 16, wherein the rib includes a top edge, the top edge recessed from a top surface of the power distribution box and each of the pair of ribs includes an engagement surface extending along a height of the power distribution box.

\* \* \* \* \*